(12) United States Patent
Qian et al.

(10) Patent No.: US 10,353,131 B2
(45) Date of Patent: Jul. 16, 2019

(54) DEVICE, SYSTEM, BACKLIGHT MODULE AND TEST METHOD FOR SIMULATING LIGHT GUIDE PLATE

(71) Applicants: BOE TECHNOLOGY GROUP CO., LTD., Beijing (CN); HEFEI BOE DISPLAY LIGHTING CO., LTD., Anhui (CN)

(72) Inventors: Yejia Qian, Beijing (CN); Dejun Li, Beijing (CN); Yinyan Xue, Beijing (CN); Yang Yang, Beijing (CN); Zhi Zhu, Beijing (CN); Zhi Yang, Beijing (CN); Shanzhi Hu, Beijing (CN); Fei Wei, Beijing (CN)

(73) Assignees: BOE TECHNOLOGY GROUP CO., LTD., Beijing (CN); HEFEI BOE DISPLAY LIGHTING CO., LTD., Anhui (CN)

( * ) Notice: Subject to any disclaimer, the term of this patent is extended or adjusted under 35 U.S.C. 154(b) by 101 days.

(21) Appl. No.: 15/534,606

(22) PCT Filed: Jan. 4, 2017

(86) PCT No.: PCT/CN2017/070166
§ 371 (c)(1),
(2) Date: Jun. 9, 2017

(87) PCT Pub. No.: WO2017/177729
PCT Pub. Date: Oct. 19, 2017

(65) Prior Publication Data
US 2018/0188443 A1     Jul. 5, 2018

(30) Foreign Application Priority Data
Apr. 14, 2016   (CN) .......................... 2016 1 0231300

(51) Int. Cl.
*F21V 8/00*        (2006.01)
*G02B 6/00*       (2006.01)
*F21S 2/00*        (2016.01)

(52) U.S. Cl.
CPC ............ *G02B 6/0043* (2013.01); *F21S 2/005* (2013.01); *G02B 6/00* (2013.01); *G02B 6/0065* (2013.01)

(58) Field of Classification Search
None
See application file for complete search history.

(56) References Cited

U.S. PATENT DOCUMENTS 7,261,736 B1   8/2007 Azar
7,567,681 B2   7/2009 Pelrine et al.
(Continued)

FOREIGN PATENT DOCUMENTS

AU    2004315868 A1    9/2005
AU    2004315868 B2    5/2009
(Continued)

OTHER PUBLICATIONS

First Office Action for Chinese Patent Application No. 201610231300.X dated Jun. 5, 2018.
International Search Report for PCT/CN2017/070166, dated Mar. 31, 2017.

*Primary Examiner* — Elmito Breval
(74) *Attorney, Agent, or Firm* — Calfee, Halter & Griswold LLP

(57) ABSTRACT

A device, a system, a backlight module and a test method for simulating a light guide plate, the device for simulating a light guide plate includes: a light guide substrate layer; and an electroactive polymer layer, wherein the electroactive polymer layer is formed on the light guide substrate layer and is configured to produce a deformation according to a layout signal of dot-patterns to simulate the dot-patterns.

17 Claims, 3 Drawing Sheets

(56) References Cited

U.S. PATENT DOCUMENTS

| | | |
|---|---|---|
| 7,787,646 B2 | 8/2010 | Pelrine et al. |
| 8,222,799 B2 | 7/2012 | Polyakov et al. |
| 2005/0157893 A1 | 7/2005 | Pelrine et al. |
| 2008/0289952 A1 | 11/2008 | Pelrine et al. |
| 2008/0291525 A1* | 11/2008 | Kim .................... G02B 26/0808 359/291 |
| 2010/0109486 A1 | 5/2010 | Polyakov et al. |
| 2012/0179248 A1 | 7/2012 | Azar |
| 2016/0178938 A1 | 6/2016 | Wang |
| 2016/0282551 A1* | 9/2016 | Kim ..................... G02B 6/0091 |

FOREIGN PATENT DOCUMENTS

| | | |
|---|---|---|
| CA | 2537244 A1 | 9/2005 |
| CA | 2742410 A1 | 5/2010 |
| CA | 2537244 C | 11/2013 |
| CN | 102272959 A | 12/2011 |
| CN | 102537754 A | 7/2012 |
| CN | 102829435 A | 12/2012 |
| CN | 104380171 A | 2/2015 |
| CN | 104516109 A | 4/2015 |
| CN | 105676343 A | 6/2016 |
| CN | 205507130 U | 8/2016 |
| EP | 1665880 A2 | 6/2006 |
| EP | 2347459 A1 | 7/2011 |
| EP | 1665880 B1 | 12/2012 |
| JP | 2011040395 A | 2/2011 |
| WO | 2005079187 A2 | 9/2005 |
| WO | 2010054115 A1 | 5/2010 |

* cited by examiner

… (1)

DEVICE, SYSTEM, BACKLIGHT MODULE AND TEST METHOD FOR SIMULATING LIGHT GUIDE PLATE

CROSS-REFERENCE TO RELATED APPLICATIONS

The present application is based on International Application No. PCT/CN2017/070166, filed on Jan. 4, 2017, which is based upon and claims priority to Chinese Patent Application No. 201610231300. X, filed Apr. 14, 2016, and the entire contents thereof are incorporated herein by reference.

TECHNICAL FIELD

The present disclosure relates to the field of optical design and optical test technology, and more particularly, to a device, a system, a backlight module and a test method for simulating a light guide plate.

BACKGROUND

At present, optical design and test evaluation method of a light guide plate in the related art includes the following steps: arranging dot-patterns through optical design software (such as math cad), and then producing a light guide plate with the dot-patterns through printing, rolling, injection molding; assembling the light guide plate and other components (such as a film, a light bar, a plastic frame, a backplane, etc.) into a backlight module; finally, performing optical testing and evaluation on the assembled backlight module. The drawbacks of the existing optical guide plate design and test evaluation system and method are that the periods of design and test evaluation of the light guide plate are too long and the costs are high due to the need to produce a light guide plate with dot-patterns.

Electroactive Polymer (EAP) is a kind of new intelligent polymer material which can produce various forms of mechanical response such as telescopic, bending, tightening or expansion through changes of the internal structure of the material under an applied electric field. According to the actuation mechanism of the electroactive polymer, it can be divided into two types: an electronic type EAP (Electronic EAP) and an ion type EAP (Ionic EAP). As its excellent electrical actuating performance, EAP is mainly used for micro-sensors, sensors and bionic devices.

It should be noted that, information disclosed in the above background portion is provided only for better understanding of the background of the present disclosure, and thus it may contain information that does not form the prior art known by those ordinary skilled in the art.

SUMMARY

Exemplary embodiments of the present disclosure provide a device, a system, a backlight module and a test method for simulating a light guide plate.

According to a first aspect of the present disclosure, there is provided a device for simulating a light guide plate, comprising:
a light guide substrate layer; and
an electroactive polymer layer,
wherein the electroactive polymer layer is formed on the light guide substrate layer and is configured to produce a deformation according to a layout signal of dot-patterns to simulate the dot-patterns.

According to a second aspect of the present disclosure, there is provided a backlight module, comprising the above described device for simulating a light guide plate, a back cover, a light source, a reflective film and an optical film, wherein, the light source is provided on a side wall of the back cover, the reflective film, the device for simulating a light guide plate and the optical film are sequentially laminated on bottom of the back cover, and the reflective film is provided below the electroactive polymer layer.

According to a third aspect of the present disclosure, there is provided a system for simulating a light guide plate, comprising the above described backlight module, and a signal generation apparatus configured to generate a layout signal of dot-patterns, and supply the layout signal of dot-patterns to the backlight module.

According to a fourth aspect of the present disclosure, there is provided a test method of the above described device for simulating a light guide plate, comprising:
generating the layout signal of dot-patterns;
controlling the electroactive polymer layer to be deformed according to the layout signal of dot-patterns, and
performing optical test on the device for simulating a light guide plate.

BRIEF DESCRIPTION OF THE DRAWINGS

In order to more clearly illustrate the technical solutions in embodiments of the present disclosure or the related art, the following drawings, which are to be used in the description of the embodiments or the prior art, will be briefly described below. Apparently, the drawings in the following description are only for some embodiments of the disclosure, and other drawings may be obtained by those skilled in the art without making creative effort.

DETAILED DESCRIPTION

Figure 1:
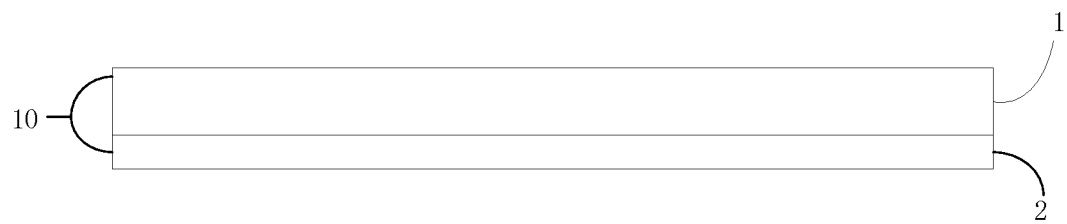
FIG. 1 is a structural view of a device for simulating a light guide plate according to an embodiment of the present disclosure.

In order to make the objective, technical solutions and advantages of the embodiments of the present disclosure to be more apparent, the technical solutions in the embodiments of the present disclosure will be clearly and thoroughly described in combination with the drawings. Apparently, the described embodiments are merely part of the embodiments and not all of the embodiments of the present disclosure. Based on the embodiments of the present disclosure, all other embodiments obtained by those of ordinary skill in the art without making creative effort are within the protection scope of the present disclosure.

In the description of the present disclosure, it is to be noted that the azimuth or positional relationship indicated by the terms "upper", "lower", "top", "bottom" and the like is based on the azimuth or positional relationship shown in the drawings, is only for convenience in describing the present disclosure and for simplifying description, and is not intended or implied that the means or elements referred to must have a particular orientation and be constructed and operated in a particular orientation and therefore can not be construed as limiting the disclosure.

In addition, in the description of the present disclosure, unless otherwise indicated, the meaning of "a plurality of" is two or more.

As shown in FIG. 1, one embodiment of the present disclosure provides a device 10 for simulating a light guide plate, comprising a light guide substrate layer 1 and an EAP (Electroactive Polymer) layer 2. The EAP layer 2 is formed on the light guide substrate layer 1 and configured to produce a deformation according to a layout signal of dot-patterns so that the distribution of the dot-patterns of the light guide plate can be simulated in real time, thereby periods of design and test evaluation of the light guide plate can be reduced, and cost can be saved. The layout signal of dot-patterns may be used to indicate the number and size of the dot-patterns and the positions of the dot-patterns on the light guide plate. The dot-patterns are used to reflect the light incident thereon to the light guide substrate layer, thereby eventually converting a line light source into a surface light source.

It is to be noted that the light guide substrate layer 1 according to the present embodiment can be made of polymethyl methacrylate (PMMA) or polycarbonate (PC). The electroactive polymer layer 2 according to the present embodiment may be an electron type EAP or the like.

Figure 2:
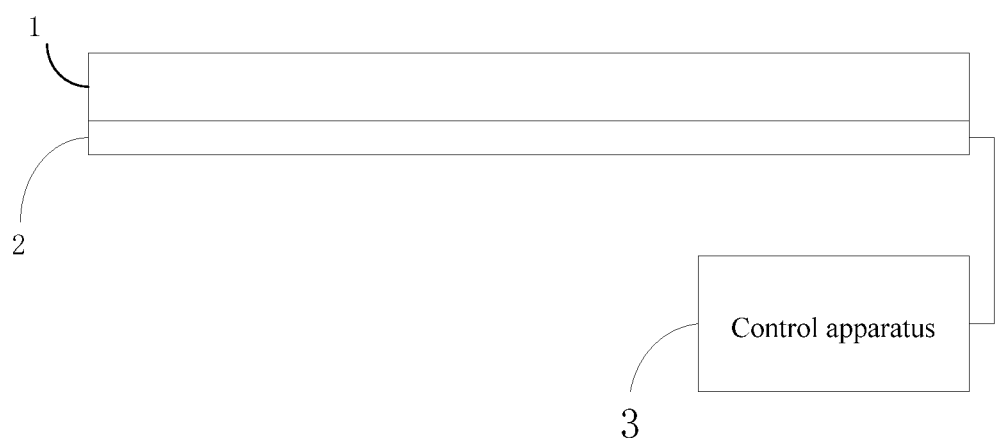
FIG. 2 is a structural view of a device for simulating a light guide plate according to another embodiment of the present disclosure.

As shown in FIG. 2, another embodiment of the present disclosure further provides a device for simulating a light guide plate. Different from that in the embodiment according to FIG. 1, the device for simulating a light guide plate shown in FIG. 2 further comprises a control apparatus 3. The control apparatus 3 may comprise an electric field generation module which may be configured to generate an electric field corresponding to the layout signal of dot-patterns in accordance with the layout signal of dot-patterns. The generated electric field acts directly or indirectly on the EAP layer 2, thereby causes the EAP layer 2 to be deformed to simulate the dot-patterns. The internal structure of the electroactive polymer can be changed due to the action of an external electric field, resulting in deformation (e.g., stretching, bending, tightening, expansion, etc.). The electric field is a typical vector field, the deformation of the electroactive polymer can be accurately controlled by controlling the electric field strength (e.g., distribution, size and direction of the vector, etc.). Thus, the number, size and positon of each dot-pattern can be accurately simulated.

Figure 3:
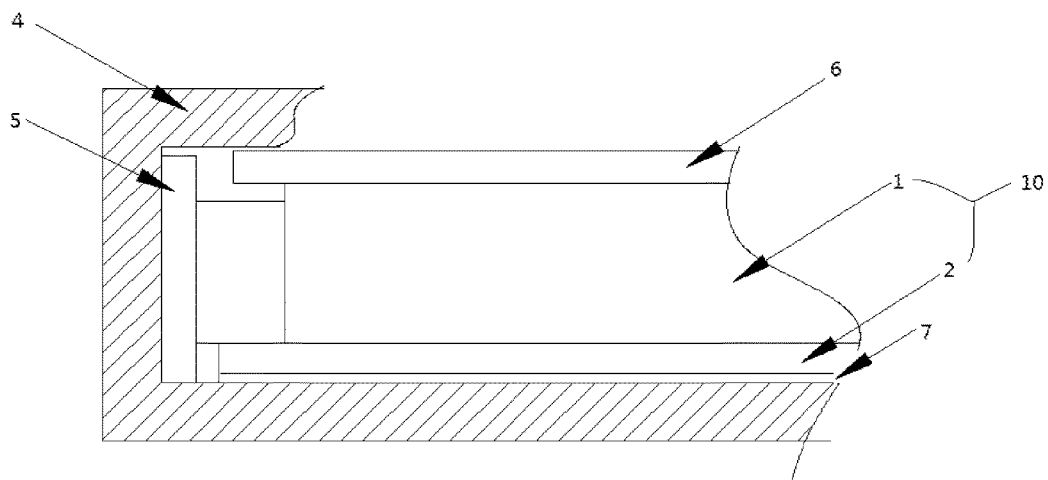
FIG. 3 is a partial structural view of a backlight module according to an embodiment of the present disclosure.

As shown in FIG. 3, an embodiment of the present disclosure provides a backlight module comprising a device 10 for simulating a light guide plate as described above (i.e., comprising a light guide substrate layer 1 and an EAP layer 2), a back cover 4, a light source 5, a reflective film 7, and an optical film 6. As can be seen from FIG. 3, one side of the back cover 4 has an opening with a cavity formed therein. The device 10 for simulating a light guide plate, the reflective film 7, the optical film 6 and the light source 5 are provided in the cavity of the back cover 4. Specifically, the reflective film 7 is provided below the device 10 for simulating a light guide plate. The light source 5 may be provided on the side wall of the back cover 4, and the reflective film 7, the light guide plate 10, and the optical film 6 are sequentially laminated on the bottom of the back cover 4. According to an embodiment of the present disclosure, the light source 5 may be a light bar or a point light source or the like. The reflective film 7 is used to reflect the light into the device 10 for simulating a light guide plate, and the reflective film 7 can be specular reflection to improve the utilization of light.

Further, the backlight module according to an embodiment of the present disclosure may further comprise a plastic frame for encapsulating the backlight module.

According to an embodiment of the present disclosure, the optical film 6 may further comprise a diffusion film and a prism film, and the prism film is provided on the diffusion film. The diffusion film may contain a plurality of particles to diffuse the light from the light guide substrate layer 1 and cause the light to propagate toward the prism film. Therefore, a viewing angle can be broaden and the dot-patterns simulated by the EAP layer 2 can be concealed. The prism film can cause the diffused light to be concentrated in a certain angle.

The light emitting process of the backlight module shown in FIG. 3 is as follows: the light emitted from the light source 5 provided on the side wall of the back cover 4 or the light emitted from the light source 5 and reflected by the reflective film 7 is incident on the EAP layer 2 and is reflected by the dot-patterns simulated by the EAP layer 2 to the light guide substrate layer 1. And then, the light from the light guide substrate layer 1 diffuses in the diffusion film and propagates toward the prism film, and is finally emitted by the prism film.

Figure 4:
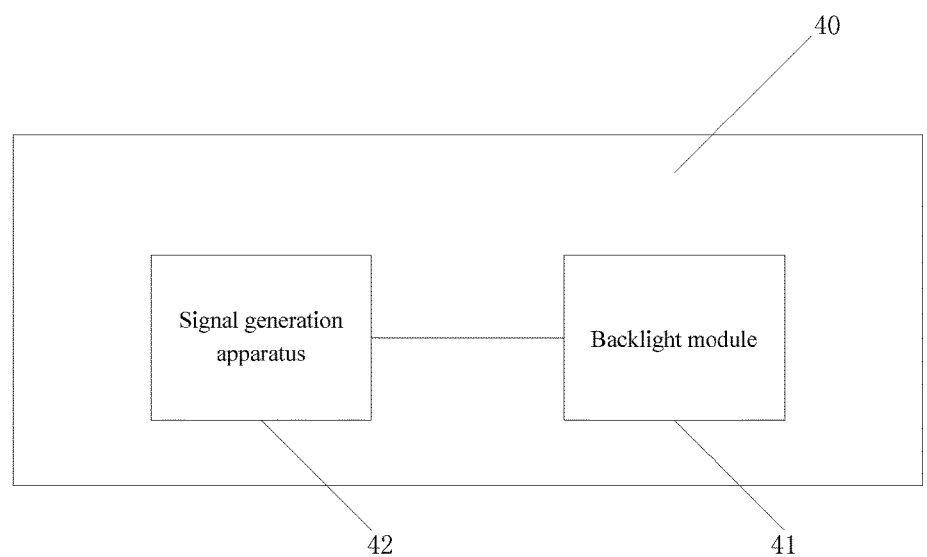
FIG. 4 is a block diagram of a system for simulating a light guide plate in accordance with an embodiment of the present disclosure.

As shown in FIG. 4, one embodiment of the present disclosure provides a system 40 for simulating a light guide plate. The system 40 comprises a backlight module 41 as described above and a signal generation apparatus 42. The signal generation apparatus 42 is used to generate a layout signal of dot-patterns, and supply the layout signal of dot-patterns to the backlight module 41. The EAP layer 2 of the device 10 for simulating the light guide plate in the backlight module 41 is deformed according to the generated layout signal of dot-patterns to simulate the dot-patterns. The structure and the light emitting process of the backlight module 51 have been described above and will not be described here.

Figure 5:
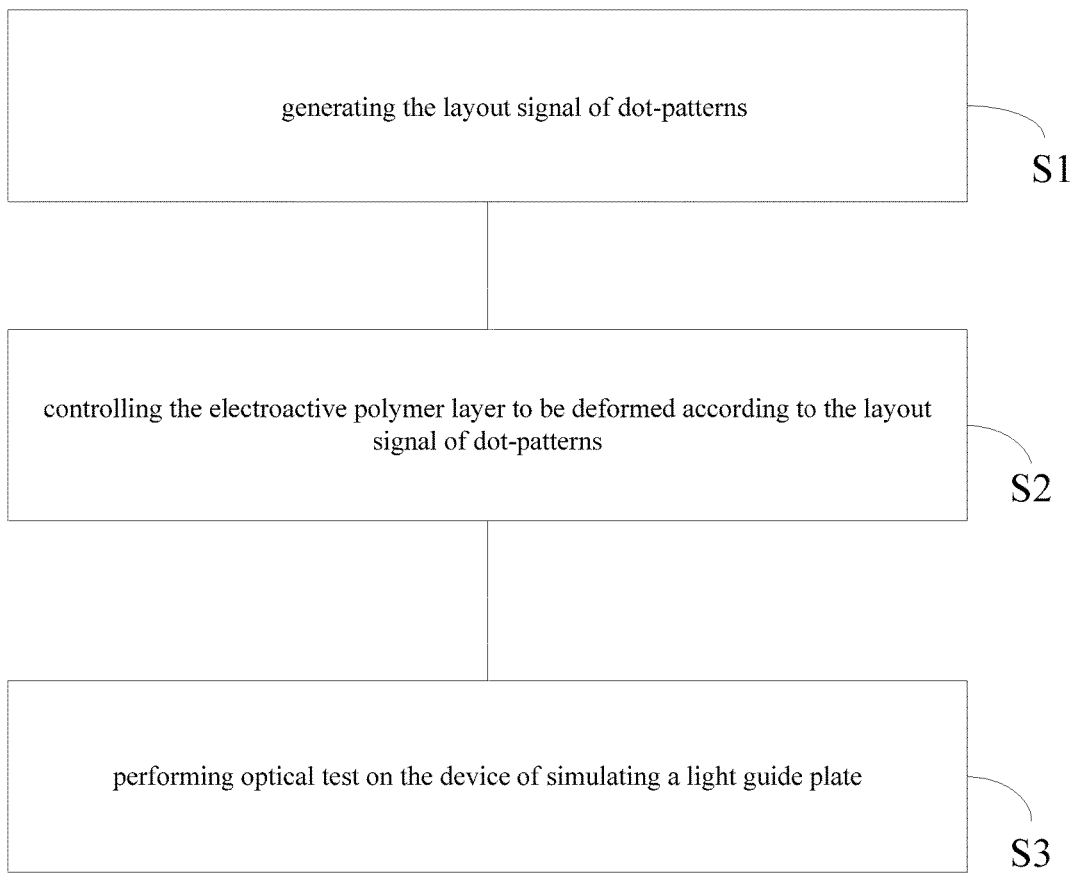
FIG. 5 is a flow chart of a test method according to an embodiment of the present disclosure.

FIG. 5 shows a flow chart of a test method for a device 10 for simulating a light guide plate as described above according to an embodiment of the present disclosure.

As shown in FIG. 5, in step 51, a layout signal of dot-patterns is generated, for example, through an optical software such as Math Cad, Bldots, etc. The layout signal of dot-patterns can be used to indicate the number, size of each dot-pattern, and the positon of each dot-pattern on the light guide plate.

In step S2, the deformation of the EAP layer 2 is controlled according to the layout signal of dot-patterns. Since the mechanical energy and the electric energy in the EAP can be converted to each other by the electrostatic field. In this step, the electric field corresponding to the layout signal of dot-patterns can be generated according to the layout signal of dot-patterns.

The internal structure of the electroactive polymer can be changed due to the action of the external electric field, resulting in deformation (e.g., stretching, bending, tightening, expansion, etc.). The electric field is a typical vector field, the deformation of the electroactive polymer can be accurately controlled by controlling the electric field strength (e.g., distribution, size and direction of the vector, etc.). Thus, the number, size and position of each dot-pattern can be accurately simulated.

In step S3, the apparatus 10 for simulating a light guide plate is subjected to an optical test. The test now is the same as that of the guide plate in the related art, and will not be described here. In the step S3, if the test result does not reach a predetermined condition, it is selectable to repeat steps S1 to S3 until the test result satisfies the predetermined condition.

In view of the above, the device, the system and the backlight module and the test method for simulating a light guide plate according to embodiments of the present disclosure can simulate the distribution of dot patterns of the light guide plate in real time without producing the light guide plate, thereby the periods of the design and test and evaluation of a light guide plate can be shorten, and the cost can be saved.

The above contents are only the embodiments of the present disclosure. However, the scope of the present invention is not limited thereto. Within the technology scope disclosed in the present disclosure, any change or substitution that can easily be contemplated by those skilled in the art should be covered within the protection scope of the present disclosure. Accordingly, the protection scope of the present disclosure should be based on the protection scope of the claims.

What is claimed is:

1. A device for simulating a light guide plate, comprising: a light guide substrate layer; and
an electroactive polymer layer formed on the light guide substrate layer, and
a control apparatus comprising an electric field generation module configured to generate an electric field according to a layout signal of dot-patterns used for the light guide plate, wherein the layout signal of dot-patterns configured to indicate number and size of the dot-patterns to be formed and positions of the dot-patterns on the light guide plate,
wherein the electroactive polymer layer is deformed by the action of the electric field to form the dot-patterns, and the dot-patterns are configured to reflect light incident thereon to the light guide substrate layer.

2. The device for simulating a light guide plate of claim 1, wherein the light guide substrate layer is made of polymethyl methacrylate or polycarbonate.

3. A backlight module, comprising the device for simulating a light guide plate of claim 1, a back cover, a light source, a reflective film and an optical film, wherein the light source is provided on a side wall of the back cover, the reflective film, the device for simulating a light guide plate and the optical film are sequentially laminated on bottom of the back cover, and the reflective film is provided below the electroactive polymer layer.

4. The backlight module of claim 3, wherein the back cover has a cavity, and the device for simulating the light guide plate, the reflective film, the optical film and the light source are provided in the cavity of the back cover.

5. A system for simulating a light guide plate, comprising the backlight module of claim 4, and a signal generation apparatus configured to generate a layout signal of dot-patterns, and to supply the layout signal of dot-patterns to the backlight module.

6. The backlight module of claim 3 further comprising a plastic frame for encapsulating the backlight module.

7. The backlight module of claim 3 further comprising a diffusion film and a prism film provided on the diffusion film.

8. A system for simulating a light guide plate, comprising the backlight module of claim 7, and a signal generation apparatus configured to generate a layout signal of dot-patterns, and to supply the layout signal of dot-patterns to the backlight module.

9. A system for simulating a light guide plate, comprising the backlight module of claim 3, and a signal generation apparatus configured to generate a layout signal of dot-patterns, and to supply the layout signal of dot-patterns to the backlight module.

10. A backlight module, comprising the device for simulating a light guide plate of claim 1, a back cover, a light source, a reflective film and an optical film, wherein the light source is provided on a side wall of the back cover, the reflective film, the device for simulating a light guide plate and the optical film are sequentially laminated on bottom of the back cover, and the reflective film is provided below the electroactive polymer layer.

11. A system for simulating a light guide plate, comprising the backlight module of claim 10, and a signal generation apparatus configured to generate a layout signal of dot-patterns, and to supply the layout signal of dot-patterns to the backlight module.

12. A backlight module, comprising the device for simulating a light guide plate of claim 1, a back cover, a light source, a reflective film and an optical film, wherein the light source is provided on a side wall of the back cover, the reflective film, the device for simulating a light guide plate and the optical film are sequentially laminated on bottom of the back cover, and the reflective film is provided below the electroactive polymer layer.

13. A system for simulating a light guide plate, comprising the backlight module of claim 12, and a signal generation apparatus configured to generate a layout signal of dot-patterns, and to supply the layout signal of dot-patterns to the backlight module.

14. A test method of the device for simulating a light guide plate of claim 1, comprising:
generating the layout signal of dot-patterns;
controlling the electroactive polymer layer to be deformed according to the layout signal of dot-patterns; and
performing optical test on the device for simulating a light guide plate.

15. The test method of claim 14, wherein the step of controlling the electroactive polymer layer to be deformed according to the layout signal of dot-patterns comprises generating an electric field and causing the electroactive polymer layer to be deformed by the electric field.

16. A test method of the device for simulating a light guide plate of claim 1, comprising:
generating the layout signal of dot-patterns;
controlling the electroactive polymer layer to be deformed according to the layout signal of dot-patterns; and
performing optical test on the device for simulating a light guide plate.

17. A test method of the device for simulating a light guide plate of claim 1, comprising:
generating the layout signal of dot-patterns;
controlling the electroactive polymer layer to be deformed according to the layout signal of dot-patterns; and
performing optical test on the device for simulating a light guide plate.

* * * * *